United States Patent
Gaubil et al.

(10) Patent No.: US 8,563,454 B2
(45) Date of Patent: *Oct. 22, 2013

(54) REFRACTORY PRODUCT WITH HIGH ZIRCONIA CONTENT

(75) Inventors: Michel Gaubil, Les Angles (FR); Isabelle Cabodi, Cavaillon (FR); Sophie Papin, Villeneuve la Garenne (FR)

(73) Assignee: Saint-Gobain Centre de Recherches et D'Etudes Europeen, Courbevoie (FR)

( * ) Notice: Subject to any disclaimer, the term of this patent is extended or adjusted under 35 U.S.C. 154(b) by 47 days.

This patent is subject to a terminal disclaimer.

(21) Appl. No.: 13/203,126

(22) PCT Filed: Feb. 24, 2010

(86) PCT No.: PCT/IB2010/050816
§ 371 (c)(1),
(2), (4) Date: Oct. 11, 2011

(87) PCT Pub. No.: WO2010/097769
PCT Pub. Date: Sep. 2, 2010

(65) Prior Publication Data
US 2012/0046156 A1    Feb. 23, 2012

(30) Foreign Application Priority Data
Feb. 25, 2009   (FR) ................................. 09 51189

(51) Int. Cl.
C04B 35/484    (2006.01)
(52) U.S. Cl.
USPC ........................................ 501/105; 501/107
(58) Field of Classification Search
USPC .................................. 501/105, 107
See application file for complete search history.

(56) References Cited

U.S. PATENT DOCUMENTS

| | | | |
|---|---|---|---|
| 5,023,218 A | 6/1991 | Zanoli et al. | |
| 5,466,643 A | 11/1995 | Ishino et al. | |
| 7,598,195 B2 * | 10/2009 | Gupta et al. | 501/105 |
| 7,655,587 B2 * | 2/2010 | Boussant-Roux et al. | 501/105 |
| 7,687,422 B2 * | 3/2010 | Boussant-Roux et al. | 501/105 |
| 7,842,633 B2 * | 11/2010 | Tomura et al. | 501/105 |
| 8,268,742 B2 * | 9/2012 | Sato | 501/104 |
| 8,273,673 B2 * | 9/2012 | Cabodi et al. | 501/105 |
| 8,288,300 B2 * | 10/2012 | Cabodi et al. | 501/105 |
| 2007/0249481 A1 | 10/2007 | Gupta et al. | |
| 2008/0076659 A1 * | 3/2008 | Boussant-Roux et al. | 501/105 |
| 2009/0038936 A1 * | 2/2009 | Boussant-Roux et al. | 204/242 |
| 2010/0257901 A1 * | 10/2010 | Cabodi et al. | 65/374.13 |
| 2011/0212826 A1 * | 9/2011 | Cabodi et al. | 501/104 |
| 2012/0295785 A1 * | 11/2012 | Gaubil et al. | 501/104 |

FOREIGN PATENT DOCUMENTS

| | | |
|---|---|---|
| DE | 44 03 161 A1 | 8/1994 |
| EP | 0 403 387 B1 | 10/1994 |
| FR | 1 208 577 A | 2/1960 |
| FR | 75 893 E | 8/1961 |
| FR | 82 310 E | 1/1964 |
| FR | 2 701 022 A1 | 8/1994 |
| FR | 2 897 861 A1 | 8/2007 |
| FR | 2 897 862 A1 | 8/2007 |
| GB | 1036893 | 7/1966 |
| JP | A 63-285173 | 11/1988 |
| JP | A 06-287059 | 10/1994 |
| WO | WO 2005/068393 A1 | 7/2005 |
| WO | WO 2007/099253 A2 | 9/2007 |
| WO | WO 2009/027610 A2 | 3/2009 |
| WO | WO 2009/027611 A2 | 3/2009 |

OTHER PUBLICATIONS

International Search Report for International Application No. PCT/IB2010/050816 mailed May 12, 2010.
Original and English-language translation of French Written Opinion for International Application No. PCT/IB2010/050816.
French Search Report for French Application No. FR 0951189 dated Aug. 17, 2009.

* cited by examiner

*Primary Examiner* — Karl Group
(74) *Attorney, Agent, or Firm* — Oliff & Berridge, PLC

(57) ABSTRACT

A fused and cast refractory product including, in mass percentages on the basis of the oxides and for a total of 100% of the oxides:

| | |
|---|---|
| $ZrO_2 + HfO_2$: | balance to 100%; |
| $SiO_2$: | 7.0% to 11.0%; |
| $Al_2O_3$: | 0.2% to 0.7%; |
| $Na_2O + K_2O$: | <0.10%; |
| $B_2O_3$: | 0.3% to 1.5%; |
| $CaO + SrO + MgO + ZnO + BaO$: | <0.4%; |
| $P_2O_5$: | <0.15%; |
| $Fe_2O_3 + TiO_2$: | <0.55%; |
| Other oxide species: | <1.5%; | the mass content of a dopant selected from $Nb_2O_5$, $Ta_2O_5$ and mixtures thereof being of less or equal to 1.0%, and the A/B ratio of the $Al_2O_3/B_2O_3$ mass contents being less than or equal to 2.0.

14 Claims, No Drawings

REFRACTORY PRODUCT WITH HIGH ZIRCONIA CONTENT

CROSS-REFERENCE

This application is a U.S. national stage application of PCT/IB2010/050816, filed Feb. 24, 2010, which claims priority to French application FR 0951189, filed Feb. 25, 2009. Each of these applications is incorporated herein by reference in its entirety.

TECHNICAL FIELD

The invention relates to a novel fused and cast refractory product with high zirconia content.

STATE OF THE ART

Among refractory products, a distinction is made between fused and cast products well known for building glass melting furnaces, and sintered products.

Unlike sintered products, fused and cast products most often include an intergranular glassy phase joining crystallized grains. Problems posed by sintered products and by fused and cast products, and adopted technical solutions for resolving them are therefore generally different. A composition developed for making a sintered product is therefore not a priori usable as such for making a fused and cast product and vice versa.

Fused and cast products often called electrofused products, are obtained by melting a mixture of suitable raw materials in an electric arc furnace or by any other technique suitable for these products. The molten material is then cast into a mold and the obtained product then undergoes a controlled cooling cycle in order to be brought to room temperature without fracturing it. This operation is also called <<annealing>> by one skilled in the art.

Among fused and cast products, electrofused products with high zirconia content, i.e. including more than 85% by weight of zirconia ($ZrO_2$), are notorious for their property of very high resistance to corrosion without coloration of the produced glass and without generating defects.

Conventionally, fused and cast products with high zirconia content also include sodium oxide ($Na_2O$) in order to prevent formation of zircon from zirconia and silica present in the product. Formation of zircon is indeed detrimental when it is accompanied by a reduction in volume of the order of 20%, thereby generating mechanical stresses at the origin of cracks.

The product ER-1195 produced and marketed by Saint-Gobain SEFPRO and covered by patent EP-B-403 387 is today widely used in glass melting furnaces. Its chemical composition comprises about 94% of the zirconia, 4 to 5% of silica, about 1% of alumina, 0.3% of sodium oxide and less than 0.05% by weight of $P_2O_5$. It is typical of products with high zirconia content used for glass making furnaces.

FR 2 701 022 describes fused and cast products with high zirconia content which contain 0.05 to 1.0% by weight of $P_2O_5$ and 0.05 to 1.0% by weight of boron oxide $B_2O_3$. These products have high electric resistivity. With this, it is advantageously possible to stabilize electric consumption during electric melting of glass and avoid any short-circuit problem in the refractory products causing their rapid degradation. Indeed, during electric melting of glass, part of the electric current passes through the refractory products. The increase in resistivity of these refractory products enables reduction of the amount of electric current capable of flowing through them.

WO 2005 068393 describes fused and cast products with high zirconia content having high electric resistivity while minimizing BaO, SrO, MgO, CaO, $P_2O_5$, $Na_2O$ and $K_2O$ contents. These products contain 0.1 to 1.2% by weight of $B_2O_3$ for alumina contents comprised between 0.9 and 2.5%.

JP 63 285173 describes fused and cast products with high zirconia content having good electric resistivity and resistance to cracking for silica contents of less than 6.5%.

The present development of high quality glasses, in particular glass panes for LCD type flat screens, increases the requirements for refractory products of glass melting furnaces. In particular, there is a need for refractory products having further enhanced electric resistivity, without necessarily resorting to dopants.

The present invention aims at meeting this need.

SUMMARY OF THE INVENTION

More particularly, the invention relates to a fused and cast refractory product, comprising in mass percentages on the basis of oxides and for a total amount of 100% of the oxides:

| | |
|---|---|
| $ZrO_2 + Hf_2O$: | balance to 100%; |
| $SiO_2$: | 7.0% to 12.5%; |
| $Al_2O_3$: | 0.2% to 0.8%; |
| $Na_2O + K_2O$: | <0.10%; |
| $B_2O_3$: | 0.3% to 1.5%; |
| $CaO + SrO + MgO + ZnO + BaO$: | <0.4%; |
| $P_2O_5$: | <0.15%; |
| $Fe_2O_3 + TiO_2$: | <0.55%; |
| other oxide species: | <1.5%; | the « A/B » ratio of the $Al_2O_3/B_2O_3$ mass contents being less than or equal to 2.0.

As this will be seen later on, surprisingly, the inventors have discovered that with such a composition the product according to the invention may have improved electric resistivity.

A refractory product according to the invention may then include one or more of the following optional features:

- The A/B ratio of the $Al_2O_3/B_2O_3$ mass contents is less than or equal to 1.8, preferably less than 1.5, preferably less than 1.2, preferably less than 1.0, less than 0.8, or even less than 0.7.
- The A/B ratio of the $Al_2O_3/B_2O_3$ mass contents is greater than 0.1, or even greater than 0.2, or even greater than 0.3.
- The mass silica ($SiO_2$) content is less than or equal to 11.0%, or even less than or equal to 10.0%, or even less than or equal to 9.5%.
- The mass silica ($SiO_2$) content is greater than or equal to 7.5%, greater than or equal to 7.7%, or even greater than or equal to 8.0%.
- The mass alumina ($Al_2O_3$) content is less than or equal to 0.7%, or even less than or equal to 0.6%, or even less than or equal to 0.5%.
- The mass $Al_2O_3$ content is greater than or equal to 0.25%, greater than or equal to 0.3%. In an embodiment, this content is greater than or equal to 0.4%.
- Alumina ($Al_2O_3$) is only present as impurities.
- The mass ($Na_2O+K_2O$) content is less than or equal to 0.05%, or even less than or equal to 0.03%.
- The mass $B_2O_3$ content is greater than or equal to 0.35%, or even greater than or equal to 0.4%, or even greater than or equal to 0.5%.
- The mass $B_2O_3$ content is less than or equal to 1.2%, or even less than or equal to 1.0%, or even less than or equal to 0.80%, or less than or equal to 0.75%, or less than or equal to 0.70%, or less than or equal to 0.65%.

The mass $P_2O_5$ content is less than or equal to 0.05%.

Iron and/or titanium and/or calcium and/or strontium and/or barium and/or magnesium and/or zinc and/or phosphorus oxides are only present as impurities.

The mass content of iron and/or titanium oxides, $Fe_2O_3+TiO_2$, is less than 0.4%, preferably less than 0.3%, preferably less than 0.2%.

The calcium and/or strontium and/or barium and/or magnesium and/or zinc oxide mass content is less than 0.2%, preferably less than 0.1%.

The total calcium and/or strontium and/or barium and/or magnesium and/or zinc oxide, $CaO+SrO+BaO+MgO+ZnO$, mass content is less than 0.3%, preferably less than 0.2%.

The total mass content of <<other oxides species>> is less than 1.0%.

The <<other oxide species>> only consist of impurities and the total mass content of the <<other oxide species>> is less than 0.6%, less than 0.5%, or even less than 0.3%.

The product includes a mass content greater than or equal to 0.1%, preferably greater than or equal to 0.2%, preferably greater than or equal to 0.25% and/or less than or equal to 1.3%, less than or equal to 1.0%, preferably less than or equal to 0.9%, preferably still less than or equal to 0.6% of a dopant selected from $Nb_2O_5$, $Ta_2O_5$ and mixtures thereof.

The molar ratio $ZrO_2/(Nb_2O_5+Ta_2O_5)$ is comprised between 200 and 350.

The molar ratio $ZrO_2/(Nb_2O_5+Ta_2O_5)$ is greater than 250.

The mass content of dopant $Ta_2O_5$ is greater than or equal to 0.1%, preferably greater than or equal to 0.2%, and/or less than or equal to 1.2%, preferably less than or equal to 0.6%.

The mass content of dopant $Nb_2O_5$ is greater than or equal to 0.1%, preferably greater than or equal to 0.2%, and/or less than or equal to 1.0%, preferably less than or equal to 0.6%.

In an embodiment, the total mass $Nb_2O_5+Ta_2O_5$ content is less than or equal to 0.6%.

The mass silica ($SiO_2$) content is greater than or equal to 8.0% and less than or equal to 10.0% and the mass content of dopant selected from $Nb_2O_5$, $Ta_2O_5$ and mixtures thereof is less than or equal to 0.6%.

The mass yttrium oxide ($Y_2O_3$) content is less than or equal to 1%, preferably less than 0.5%, preferably still less than 0.3%, or even less than 0.2%.

In one embodiment, the BaO content is less than 0.10%, or substantially zero.

The disclosed products in patent application nos. WO 2007 099 253, PCT/FR2008/051516 and PCT/FR2008/051515 (and in the patent applications of their families), and notably the products of the examples of these patent applications, are excluded from the invention.

The following products, as blocks of 220×450×150 mm³ or as cylindrical bars with a diameter of 30 mm and a height of 30 mm, are excluded from the invention, the compositions being provided in mass percentages on the basis of the oxides:

| $ZrO_2$ | $SiO_2$ | $B_2O_3$ | $Al_2O_3$ | $Nb_2O_5$ | $Ta_2O_5$ | $Y_2O_3$ | BaO |
|---|---|---|---|---|---|---|---|
| 90.3 | 7.1 | 0.6 | 0.79 | 0.33 | 0.76 | 0.2 | |
| 91.1 | 7.5 | 0.6 | 0.44 | | | 0.17 | 0.13 |
| 90 | 8.1 | 0.41 | 0.54 | 0.74 | | 0.20 | |
| 89.2 | 8.3 | 0.49 | 0.8 | 0.31 | 0.7 | 0.2 | |
| 89.8 | 8.4 | 0.48 | 0.44 | 0.66 | | 0.2 | |
| 89.3 | 8.9 | 0.49 | 0.47 | 0.71 | | 0.2 | |
| 88.6 | 9.3 | 0.54 | 0.5 | 0.76 | | 0.2 | 0.13 |
| 87.6 | 10.2 | 0.53 | 0.53 | 0.8 | | 0.19 | 0.1 |
| 87.4 | 10.8 | 0.89 | 0.54 | 0.2 | | 0.18 | 0.03 |
| 87.3 | 11.2 | 0.6 | 0.54 | 0.16 | | 0.17 | 0.02 |
| 90.2 | 7.4 | 0.9 | 0.3 | | 1.2 | | |

In one embodiment, all the products having a composition in the Table above are excluded, whatever their form.

In one embodiment, all the products having a composition close to at least one of the compositions of the Table above are excluded. A first composition is said to be <<close>> to a second composition when, regardless of the relevant constituent of the first composition, the absolute difference between the contents of said constituent in the first composition and in the second composition is less than 0.10%, in mass percent.

In a preferred embodiment, $SiO_2 \le 11.0\%$, preferably $SiO_2 \le 10.0\%$, and $Ta_2O_5+Nb_2O_5 \le 1.0\%$, preferably $Nb_2O_5 \le 0.6\%$.

Still preferably, $SiO_2 \le 10.0\%$, and $Ta_2O_5+Nb_2O_5 \le 1.0\%$, with $Nb_2O_5 \le 0.6\%$ and $Na_2O+K_2O \le 0.05\%$, or even $Na_2O+K_2O \le 0.03\%$, and $CaO+SrO+MgO+ZnO+BaO < 0.3\%$, or even $CaO+SrO+MgO+ZnO+BaO < 0.2\%$, and $BaO < 0.1\%$, and $Fe_2O_3+TiO_2 < 0.3\%$ and $Y_2O_3 < 0.3\%$.

The invention also relates to a method for making a refractory product according to the invention, comprising the following successive steps:

a) mixing raw materials in order to obtain an initial load, b) melting said initial load until a molten material is obtained, c) casting and solidifying said molten material, by cooling, so as to obtain a refractory product, this method being remarkable in that said raw materials are selected so that said refractory product is compliant with the invention.

Preferably, oxides for which a minimum content is required, notably $ZrO_2$, $SiO_2$, $B_2O_3$, or precursors of these oxides are systematically and methodically added. Preferably, the contents of these oxides are taken into account in the sources of other oxides where they are conventionally considered as impurities.

Preferably, the cooling is controlled, preferably so as to be carried out at a rate of less than 20° C. per hour, preferably at the rate of about 10° C. per hour.

The invention also relates to a glass melting furnace including a refractory product according to the invention, or a refractory product made or capable of being made according to a method according to the invention, in particular in a region intended to be in contact with the molten glass. In a furnace according to the invention, the refractory product may advantageously be part of a vessel for preparing glass by melting, notably by electric melting, where it is capable of entering into contact with molten glass at a temperature above 1,200° C.

Definitions

The mass oxide contents relate to global contents for each of the corresponding chemical elements expressed as the most stable oxide, according to the usual convention of industry; suboxides and possibly nitrides, oxynitrides, carbides, oxycarbides, carbonitrides, or even metal species of the aforementioned elements are therefore included.

A <<molten material>> is a liquid mass which in order to retain its shape, should be contained in a container. It may contain a few solid particles but in an insufficient amount for them to be able to structure said mass.

By <<impurities>>, are meant inevitable constituents, involuntarily and necessarily introduced with the raw materials or resulting from reactions with these constituents. Impurities are not required constituents, but only tolerated. For example the compounds which are part of the group of oxides, nitrides, oxynitrides, carbides, oxycarbides, carbonitrides, and metal species of iron, titanium, vanadium and chromium are impurities.

Unless indicated otherwise, all the oxide contents in the described and claimed products are mass percentages on the basis of the oxides.

DETAILED DESCRIPTION OF THE INVENTION in a fused and cast product according to the invention, with the high zirconia ($ZrO_2$) content, it is possible to meet the requirements of high resistance to corrosion without coloration of the produced glass or generation of defects detrimental to the quality of this glass.

In a product obtained by melting, $HfO_2$ is not chemically dissociable from $ZrO_2$. In the chemical composition of such a product, $ZrO_2+HfO_2$ therefore designates the total content of both of these oxides. However, according to the present invention, $HfO_2$ is not voluntarily added in the initial load. $HfO_2$ therefore only designates traces of hafnium oxide, this oxide being always naturally present in the sources of zirconia at contents generally less than 2%. For the sake of clarity, the zirconia content and the hafnium oxide trace content may therefore be designated indifferently by $ZrO_2+HfO_2$ or by $ZrO_2$, or further by <<zirconia content>>.

The hafnium oxide content, $HfO_2$, in a product according to the invention, is less than or equal to 5%, generally less than or equal to 2%.

The presence of silica $SiO_2$ notably allows the formation of an intergranular glassy phase capable of efficiently accommodating the changes in volume of zirconia during its reversible allotropic transformation, i.e. upon passing from the monoclinic phase to the tetragonal phase. With the presence of silica ($SiO_2$) at a mass content greater than 7.0%, high electric resistivities may be attained.

On the other hand, addition of silica should not exceed 12.5% since this addition is made to the detriment of the zirconia content and may therefore be detrimental to resistance to corrosion. Further, too high silica content may generate defects in the glass by releasing stones (pieces of refractory product resulting from a loss of cohesion of the product), this is considered as poor behavior upon application.

The presence of alumina promotes the formation of a stable glassy phase and improves castability of the products in the mold. Excessive content causes instability of the glassy phase (formation of crystals), which has a negative impact on the feasibility, in particular in the presence of boron oxide. The alumina mass content should therefore remain below 0.8%.

In a product according to the invention, it is considered that the oxides, $Na_2O$ and $K_2O$, have similar effects.

The $Na_2O$ and $K_2O$ oxides have an adverse effect on electric resistivity. The mass content of $Na_2O+K_2O$ should therefore be less than 0.1%.

The presence of a mass $B_2O_3$ content in a proportion such that the A/B ratio of $Al_2O_3/B_2O_3$ mass contents is less than or equal to 2 allows an increase in the electric resistivities.

According to the invention, the $Fe_2O_3+TiO_2$ mass content is less than 0.55% and that of $P_2O_5$ is less than 0.15%, preferably less than 0.10%, preferably still less than 0.05%. Indeed, these oxides are known for being harmful and their content should preferably be limited to traces introduced as impurities with the raw materials.

The <<other oxide species>> are species which are not listed above, i.e. the species other than $ZrO_2$, $Hf_2O$, $SiO_2$, $Al_2O_3$, $Na_2O$, $K_2O$, $B_2O_3$, CaO, SrO, BaO, MgO, ZnO, $P_2O_5$, $Fe_2O_3$ and $TiO_2$. In particular, $Nb_2O_5$ and $Ta_2O_5$ belong to the "other oxide species".

In one embodiment, the <<other oxide species>> are limited to species for which the presence is not particularly desired and which are generally present as impurities in the raw materials.

In another embodiment, the <<other oxide species>> may also comprise species, the presence of which is advantageous. Thus, in an embodiment, the product advantageously includes at least 0.1%, preferably at least 0.2% of a dopant with which the electric resistivity may be further improved, for example $Nb_2O_5$, $Ta_2O_5$ or mixtures thereof. The mass dopant content is however preferably less than or equal to 1.0%, preferably less than or equal to 0.9%, still preferably less than or equal to 0.6%.

In an embodiment, the <<other oxide species>> include neither $Nb_2O_5$, nor $Ta_2O_5$ (the product does not contain these oxides).

Conventionally, in a fused and cast product, the oxides account for more than 98.5%, more than 99%, or substantially 100% of the mass of the product. The same applies to a product according to the invention.

A product according to the invention may be conventionally made according to the steps a) to c) described below:
a) mixing raw materials in order to form an initial load,
b) melting said initial load until a molten material is obtained,
c) solidifying said molten material, by cooling, so as to obtain a refractory product according to the invention.

In step a), the raw materials are selected so as to guarantee the oxides' contents in the finished product.

In step b), melting is preferably achieved by means of combined action of a rather long electric arc, not producing any reduction, and of a mixing to promote re-oxidation of the products.

In order to minimize the formation of nodules with a metal aspect and to avoid the formation of cracks or crazings in the final product, it is preferable to perform melting under oxidizing conditions.

Preferentially, the long arc melting method described in French patent no. 1 208 577 and its additions, nos. 75893 and 82310, is used.

This method consists of using an electric arc furnace, the arc of which occurs between the load and at least one electrode away from this load, and of adjusting the length of the arc so that its reducing action is reduced to a minimum, while maintaining an oxidizing atmosphere above the molten bath and mixing said bath, either by the action of the arc itself, or by bubbling in the bath an oxidizing gas (air or oxygen, for example) or further by adding to the bath substances releasing oxygen such as peroxides or nitrates.

The melting may in particular be performed at a temperature above 2,300° C., preferably comprised between 2,400° C. and 2,500° C.

In step c), cooling is preferably carried out at a rate of less than 20° C. per hour, preferably at the rate of about 10° C. per hour.

A thereby made product of the invention consists of zirconia grains surrounded by a glassy phase. Zirconia may be monoclinic for more than 80%, more than 90%, more than 99% or substantially 100%, as a mass percentage. The glassy phase may include more than 50%, or even more than 70% of silica, between 5% and 20% of $B_2O_3$ and between 1% and 20% of alumina, in mass percentages on the basis of the glassy phase. The silica, $B_2O_3$ and alumina may account for more than 95%, more than 97%, or substantially for 100% of the mass of the glassy phase.

Any conventional method for making fused products based on zirconia intended for applications in glass melting furnaces may also be applied, provided that the composition of the initial load allows products to be obtained, having a composition compliant with that of a product according to the invention.

EXAMPLES

The following non-limiting examples are given with the purpose of illustrating the invention.

In these examples, the following raw materials were used:
zirconia mainly containing, as a mass average, 98.5% of $ZrO_2+HfO_2$, 0.2% of $SiO_2$ and 0.02% of $Na_2O$,
zircon sand with 33% silica,
boron oxide with a purity of more than 99%.

The raw materials were melted according to the standard melting method in an arc furnace and the molten material was then cast in order to obtain blocks with a format of 220 mm×450 mm×150 mm.

Example 1 corresponds to the product ER1195, marketed by Saint-Gobain SEFPRO, and is the reference.

For all the obtained products, crystallographic analysis reveals monoclinic zirconia crystals surrounded by a glassy phase typically including more than 70% of silica. The totality of the silica as well as of other oxide species except for zirconia are again found in the glassy phase.

Chemical analysis of the obtained products is given in Table 1; this is an average global chemical analysis, given in mass percentages.

In the following Table 1, * indicates that the example is outside the invention, an empty box corresponds to a content of less than or equal to 0.05% by mass. The balance to 100% is formed by the "other oxide species"

On the different achieved exemplary blocks, cylindrical bars of product with a diameter of 30 mm and a height of 30 mm were extracted. These bars were subject to a potential difference of 1 Volt at a frequency of 100 Hertz at 1,500° C. or 1,600° C. respectively in order to conduct electric resistivity measurements, <<R1500>> and <<R1600>>, respectively.

TABLE 1

|   | $ZrO_2$ | $SiO_2$ | $B_2O_3$ | $Al_2O_3$ | A/B ($Al_2O_3$/$B_2O_3$) | $Na_2O$ | R1500 (Ω·cm) | R1600 (Ω·cm) |
|---|---|---|---|---|---|---|---|---|
| 1* | 94.5 | 4.0 |  | 1.20 |  | 0.3 | 70 |  |
| 2* | 91.3 | 7.0 | 0.60 | 1.10 |  |  | 95 |  |
| 3* | 94.6 | 4.3 | 0.30 | 0.50 |  | 0.10 | 139 |  |
| 4* | 89.8 | 8.3 | 0.60 | 1.20 |  |  | 165 |  |
| 5* | 90.2 | 7.9 | 0.50 | 1.10 | 2.2 |  | 175 | 100 |

TABLE 1-continued

|   | $ZrO_2$ | $SiO_2$ | $B_2O_3$ | $Al_2O_3$ | A/B ($Al_2O_3$/$B_2O_3$) | $Na_2O$ | R1500 (Ω·cm) | R1600 (Ω·cm) |
|---|---|---|---|---|---|---|---|---|
| 6 | 90.8 | 8.1 | 0.40 | 0.40 | 1.0 |  | 350 | 200 |
| 7* | 88.9 | 9.4 | 0.30 | 1.10 | 3.5 |  | 265 | 180 |
| 8 | 89.3 | 9.2 | 0.60 | 0.60 | 1.0 |  | 290 | 195 |
| 9 | 89.6 | 9.2 | 0.60 | 0.30 | 0.5 |  | 390 | 260 |

A comparison of Examples 6-9 demonstrates, at a substantially constant silica content and in the absence of $Na_2O$, the positive effect of an A/B ratio of less than 2.0, or even less than 1.5, and even less than 0.8, Example 9 being the preferred one.

The results also show that the tested products of the invention have improved electric resistivity in spite of the absence of dopant.

In order to confirm these first results, the inventors proceeded with other measurements of resistivity on fused 1 kg blocks of glassy phase. These blocks were subject to a potential difference of 1 Volt at a frequency of 2,500 Hertz at 1,500° C. or 1,600° C., respectively, in order to conduct electric resistivity measurements, <<R1500>> and <<R1600>> respectively. The results are summarized in Table 2.

These tests confirm the importance of the NB ratio.

TABLE 2

| | In the analyzed glassy phase | | | | | |
|---|---|---|---|---|---|---|
|   | $SiO_2$ | $B_2O_3$ | $Al_2O_3$ | A/B | R1500 (Ω·cm) | R1600 (Ω·cm) |
| 10 | 76.2 | 9.1 | 14.7 | 1.6 | 2344 | 1259 |
| 11 | 78.3 | 9.6 | 12.1 | 1.3 | 3020 | 1778 |
| 12 | 85.8 | 8.9 | 5.2 | 0.6 | 4074 | 3162 |
| 13 | 77.6 | 15.2 | 7.2 | 0.5 | 3090 | 2188 |
| 14 | 73.4 | 18.6 | 8 | 0.4 | 2285 | 1504 |
| 15 | 77.9 | 18.5 | 3.6 | 0.2 | 3548 | 2630 |

Table 2 further shows that optimum performances on R1500 like on R1600 are obtained with Example 12, having A/B ratio of 0.6.

Of course, the present invention is not limited to the embodiments as described and illustrated, provided as illustrative and non-limiting examples.

The invention claimed is:

1. A fused and cast refractory product comprising, in mass percentages on the basis of the oxides and for a total of 100% of the oxides:

| | |
|---|---|
| $ZrO_2 + Hf_2O$: | balance to 100%; |
| $SiO_2$: | 7.0% to 11.0%; |
| $Al_2O_3$: | 0.2% to 0.7%; |
| $Na_2O + K_2O$: | <0.03%; |
| $B_2O_3$: | 0.3% to 1.5%; |
| $CaO + SrO + MgO + ZnO + BaO$: | <0.4%; |
| $P_2O_5$: | <0.15%; |
| $Fe_2O_3 + TiO_2$: | <0.3%; |
| Other oxide species: | <1.5%; and | the mass content of a dopant selected from $Nb_2O_5$, $Ta_2O_5$ and mixtures thereof being of less than or equal to 1.0%, wherein
an A/B ratio of $Al_2O_3$/$B_2O_3$ mass contents is less than or equal to 2.0, and fused and cast products as a block of 220×450×150 mm³ or a cylindrical bar of a diameter of 30 mm and a height of 30 mm, having the following chemical composition, in mass percentages on the basis of the oxides:

| $ZrO_2$ | $SiO_2$ | $B_2O_3$ | $Al_2O_3$ | $Nb_2O_5$ | $Ta_2O_5$ | $Y_2O_3$ | BaO |
|---|---|---|---|---|---|---|---|
| 91.1 | 7.5 | 0.6 | 0.44 | | | 0.17 | 0.13 |
| 90.0 | 8.1 | 0.41 | 0.54 | 0.74 | | 0.20 | |
| 89.8 | 8.4 | 0.48 | 0.44 | 0.66 | | 0.20 | |
| 89.3 | 8.9 | 0.49 | 0.47 | 0.71 | | 0.20 | |
| 88.6 | 9.3 | 0.54 | 0.50 | 0.76 | | 0.20 | 0.13 |
| 87.6 | 10.2 | 0.53 | 0.53 | 0.80 | | 0.19 | 0.10 |
| 87.4 | 10.8 | 0.89 | 0.54 | | 0.20 | 0.18 | 0.03 | are excluded.

2. The product according to claim 1, wherein the ratio A/B is less than 1.5.

3. The product according to claim 2, wherein the ratio A/B is less than 0.8.

4. The product according to claim 1, including a mass content of said dopant greater than or equal to 0.1%.

5. The product according to claim 1, including a mass content of said dopant of less than or equal to 0.6%.

6. The product according to claim 1, including a mass content of $Nb_2O_5$ less than or equal to 0.6%.

7. The product according to claim 1 including neither $Nb_2O_5$ nor $Ta_2O_5$.

8. The product according to claim 1, wherein the mass silica $SiO_2$ content is less than or equal to 10.0%.

9. The product according to claim 1, wherein the mass silica $SiO_2$ content is greater than or equal to 8.0%.

10. The product according to claim 1, wherein the mass $B_2O_3$ content is greater than or equal to 0.5%.

11. The product according to claim 1, wherein the mass $B_2O_3$ content is less than or equal to 1.0%.

12. The product according to claim 11, wherein the mass $B_2O_3$ content is less than or equal to 0.8%.

13. The product according to claim 1, wherein the mass $P_2O_5$ content is less than or equal to 0.05%, the total mass calcium and/or strontium and/or barium and/or magnesium and/or zinc oxide, CaO+SrO+BaO+MgO+ZnO, content is less than 0.3%, and the total mass content of other oxide species is less than 0.6%.

14. A fused and cast refractory product comprising, in mass percentages on the basis of the oxides and for a total of 100% of the oxides:

| | |
|---|---|
| $ZrO_2 + Hf_2O$: | balance to 100%; |
| $SiO_2$: | 7.0% to 10.0%; |
| $Al_2O_3$: | 0.2% to 0.7%; |
| $Na_2O + K_2O$: | <0.03%; |
| $B_2O_3$: | 0.3% to 1.5%; |
| $CaO + SrO + MgO + ZnO + BaO$: | <0.4%; |
| $P_2O_5$: | <0.15%; |
| $Fe_2O_3 + TiO_2$: | <0.3%; |
| Other oxide species: | <1.5%; and | a $Nb_2O_5$ and $Ta_2O_5$ contents being such that:
$Nb_2O_5 \leq 0.6\%$, and
$Nb_2O_5 + Ta_2O_5 \leq 1.0\%$, wherein
an A/B ratio of $Al_2O_3/B_2O_3$ mass contents is less than or equal to 2.0, and
a fused and cast product as a block of 220×450×150 mm³ or a cylindrical bar of a diameter of 30 mm and a height of 30 mm, having the following chemical composition, in mass percentages on the basis of the oxides:

| $ZrO_2$ | $SiO_2$ | $B_2O_3$ | $Al_2O_3$ | $Nb_2O_5$ | $Ta_2O_5$ | $Y_2O_3$ | BaO |
|---|---|---|---|---|---|---|---|
| 91.1 | 7.5 | 0.60 | 0.44 | | | 0.17 | 0.13 | are excluded.

* * * * *